United States Patent
Kurimoto et al.

(10) Patent No.: US 9,909,001 B2
(45) Date of Patent: Mar. 6, 2018

(54) RUBBER COMPOSITION AND RUBBER PRODUCT

(71) Applicant: TOYODA GOSEI CO., LTD., Kiyosu-shi, Aichi-ken (JP)

(72) Inventors: Hidekazu Kurimoto, Kiyosu (JP); Hideyuki Imai, Kiyosu (JP); Masanori Kumazaki, Kiyosu (JP); Shinji Matsunaga, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 420 days.

(21) Appl. No.: 14/301,418

(22) Filed: Jun. 11, 2014

(65) Prior Publication Data
US 2014/0371369 A1    Dec. 18, 2014

(30) Foreign Application Priority Data

Jun. 14, 2013 (JP) ................................. 2013-126182
Apr. 25, 2014 (JP) ................................. 2014-090898

(51) Int. Cl.
*C08L 23/16*    (2006.01)

(52) U.S. Cl.
CPC ..................... *C08L 23/16* (2013.01)

(58) Field of Classification Search
CPC .............................. C08K 13/02; C08L 23/16
See application file for complete search history.

(56) References Cited

U.S. PATENT DOCUMENTS

| | | | |
|---|---|---|---|
| 3,627,566 A * | 12/1971 | Stichter et al. ............... | 428/95 |
| 4,215,021 A * | 7/1980 | Ogawa et al. ................ | 524/526 |
| 4,866,101 A * | 9/1989 | Iwasa et al. .................. | 521/95 |
| 5,407,989 A * | 4/1995 | Davis et al. .................. | 524/405 |
| 6,071,582 A | 6/2000 | Tangiku et al. | |
| 2003/0194522 A1 * | 10/2003 | Kurimoto et al. ............ | 428/36.91 |
| 2010/0233422 A1 * | 9/2010 | Knowles ....................... | 428/113 |
| 2011/0092642 A1 | 4/2011 | Kurihara | |
| 2013/0109802 A1 | 5/2013 | Kurimoto et al. | |
| 2013/0217816 A1 * | 8/2013 | Yano et al. ................... | 524/238 |

FOREIGN PATENT DOCUMENTS

| | | |
|---|---|---|
| JP | 06-210798 A | 8/1994 |
| JP | 10-180941 A | 7/1998 |
| JP | 2004-002682 A | 1/2004 |
| JP | 2011-219509 A | 11/2011 |
| JP | 2013-091746 A | 5/2013 |
| WO | 2009/154152 A1 | 12/2009 |
| WO | 2013/015043 A1 | 1/2013 |

OTHER PUBLICATIONS

Office Action dated Apr. 18, 2017 issued in corresponding JP patent application No. 2014-090898 (and English translation).
Office Action dated Aug. 24, 2016 issued in corresponding CN patent application No. 201410265357.2 (and English translation).
Shen Xin Yuan, "Principles of Polymer Processing (2nd Edition)", Chinese Textile Press, Mar. 31, 2009, p. 397.

* cited by examiner

*Primary Examiner* — Alexander Kollias
(74) *Attorney, Agent, or Firm* — Posz Law Group, PLC (57) ABSTRACT

A rubber composition includes, as essential components, an EDPM polymer, a carbon black, an electrical insulating amorphous or spindle-shaped filler, a softener, and a sulfur-based vulcanizing agent as essential components, and also includes, as an optical component, an electrical insulating plate-shaped filler. An obtained vulcanized product is satisfied with the following Equations (1) and (2):

$$\text{volume resistivity} \geq 1.0 \times 10^6 \ \Omega \cdot \text{cm} \quad (1)$$

$$(M_{30}{<}100^\circ\ C.{>}/M_{30}{<}23^\circ\ C.{>}-1) \times 100 \geq -15\% \quad (2)$$

where $M_{30}{<}23^\circ\ C.{>}$ is a tensile stress at elongation of 30% as measured by a tensile test at 23° C., and $M_{30}{<}100^\circ\ C.{>}$ is a tensile stress at elongation of 30% as measured by a tensile test at 100° C.

12 Claims, 2 Drawing Sheets

RUBBER COMPOSITION AND RUBBER PRODUCT

CROSS-REFERENCE TO RELATED APPLICATIONS

This application claims the benefit of Japanese Patent Application Nos. 2014-090898 filed on Apr. 25, 2014, and 2013-126182 filed on Jun. 14, 2013, the entire contents of which are hereby incorporated by reference.

BACKGROUND

1. Technical Field

The present invention relates to a sulfur-vulcanized rubber composition and a rubber product using the same.

2. Related Art

As rubber products, those are known which require a high volume resistivity (electric resistance) and a small change in physical properties (in particular, rigidity) thereof in high temperature service environments as in automobile water hoses or the like. The reason is that the automobile water hoses are undesirably electrochemically reacted with a cooling water flowing therethrough if an electric current from a vehicle body or connection components is flowed therethrough, and also the inside of an engine room is such high temperature service environments. In Patent Documents 2 and 3, measures for increasing volume resistivity by limiting a formulation ratio of carbon black to be formulated with EPDM polymer are described.

In addition, studies are recently performed, in which rubber products are thinned to achieve weight reduction and material cost reduction and also configurations of rubber products are simplified (in a case of hoses, reduction or omission of reinforcing threads, or the like) to achieve process simplification and material cost reduction. To realize such thinning and simplification in configurations, the rubber must to have a higher rigidity, and also in a case of rubber products, such as automobile water hoses, it becomes further important that rigidity thereof is not reduced in high temperature service environments.

As measures for increasing rigidity of rubber, an increased amount of reinforcing agents, such carbon black or clay, addition of resins (thermoplastic or thermosetting), and addition of short fibers are common. However, they exhibit a high rigidity at a room temperature, but the rigidity are decreased at an elevated temperature, and accordingly, it is difficult to be applied to products, of which service temperature is high. In addition, if rigidity at an elevated temperature is ensured in anticipation of temperature dependence, the following problems are occurred.

- If the reinforcing agent is increased, viscosity is increased and thus workability, such as extrusion ability, becomes poor.
- If electrical conductive carbon black as the reinforcing agent is increased, volume resistivity of rubber products is decreased and thus applications of the rubber products are limited.
- If electrical insulating fillers, such as clay, as the reinforcing agent are increased, temperature dependence of rigidity is increased relative to a case of carbon black, and thus it is difficult to obtain rigidity at an elevated temperature.
- If resins are added, the rubber products are further hardened at a room temperature, thus handing ability thereof becomes poor.

Therefore, the present applicant has previously proposed a rubber material, in which a combination of a co-crosslinking agent made of a metal salt and a peroxide-based vulcanizing agent is applied to a rubber, such as EPDM, and formulation ratios thereof are set at predetermined amounts, thereby reducing a change in rigidity at an elevated temperature (see Patent Document 1). However, realization of such properties in sulfur vulcanization system has been desired in terms of easiness of fabrication.

[Patent Document 1] JP-A-2011-219509
[Patent Document 2] JP-A-6-210798
[Patent Document 3] JP-A-10-180941

Accordingly, an object of the present invention is to obtain a rubber composition and a rubber product, which are sulfur vulcanization system to be easily fabricated and have a higher volume resistivity and a smaller change in rigidity at an elevated temperature, and obtained therefrom.

The inventors has found that, as a result of examination on so-called white fillers having an electrical insulation property, a difference in particle shapes of white fillers is influenced on the temperature dependence of rigidity, and more specifically, amorphous or spindle-shaped filler can suppress the temperature dependence of rigidity as compared to plate-shaped or needle-shaped filler, and accordingly has led to the present invention. The reason is believed that particle shapes of plate-shaped or needle-shaped filler are changed by following a viscous movement of polymer at an elevated temperature, but particle shapes of amorphous or spindle-shaped filler are kept without following the viscous movement of polymer even at an elevated temperature.

SUMMARY (1) A rubber composition of the exemplary embodiment includes, as essential components:
an EDPM polymer;
a carbon black;
an electrical insulating amorphous or spindle-shaped filler;
a softener; and
a sulfur-based vulcanizing agent as essential components, and also includes, as an optical component:
an electrical insulating plate-shaped filler, and an obtained vulcanized product is satisfied with the following Equations (1) and (2):

$$\text{volume resistivity} \geq 1.0 \times 10^6 \ \Omega \cdot \text{cm} \tag{1}$$

$$(M_{30}\!<\!100°\ \text{C.}\!>/M_{30}\!<\!23°\ \text{C.}\!>-1) \times 100 \geq -15\% \tag{2}$$

where $M_{30}\!<\!23°\ \text{C.}\!>$ is a tensile stress at elongation of 30% as measured by a tensile test at 23° C., and
$M_{30}\!<\!100°\ \text{C.}\!>$ is a tensile stress at elongation of 30% as measured by a tensile test at 100° C.

As used herein, the room temperature means a temperature of 23±2° C. i.e., a temperature within a range of 21° C. to 25° C.

Further, the rubber composition of the exemplary embodiment is satisfied with the following Equation (3) (regression equation):

$$Z = a1S + a2Wc \cdot D + a3Wha/Ha + a4Whb/Hb \tag{3}$$

where Z is a value of the regression equation.
S is a total sulfur content/a total filling amount of rubber composition, in which the total sulfur content is a sum of:
sulfur in sulfur based vulcanizing agent;
sulfur emitted from the vulcanization accelerator during vulcanization; and sulfur in other agent in the rubber composition in a case where the rubber composition includes other agent, Wc is a formulation ratio of carbon black (part by mass based on 100 parts by mass of EPDM polymer), D is a DBP absorption amount of carbon black (Method A, cm³/100 g), Wha is a formulation ratio of amorphous or spindle-shaped filler (part by mass based on 100 parts by mass of EPDM polymer), Ha is a specific surface area of amorphous or spindle-shaped filler (m²/g), Whb is a formulation ratio of plate-shaped filler (part by mass based on 100 parts by mass of EPDM polymer).

Hb is a specific surface area of plate-shaped filler (m²/g), a1, a2, a3 and a4 are regression coefficients, a1=5.5×10⁻³, a2=0.45×10³, a3=0.21, and a4=−0.65.

Namely, regression coefficients a1, a2, a3 and a4 are obtained from results of Examples and Comparative Examples as described below by performing multiple regression analyses by a least square method, using as individual independent variables S, Wc·D, Wha/Ha and Whb/Hb, and thus, those having a value Z of 27.5 or larger are specified as desirable rubber compositions.

(2) The rubber composition of the exemplary embodiment includes:

an EDPM polymer of 100 parts by mass;

a carbon black of 66 to 93 parts by mass;

an electrical insulating filler of 87 to 145 parts by mass;

a softener of 31 to 76 parts by mass; and a sulfur-based vulcanizing agent and vulcanization accelerator so that a total sulfur content thereof is 1.2 to 1.8 parts by mass and 10 or more % by mass of the electrical insulating filler is constituted as amorphous or spindle-shaped filler, and an obtained vulcanized product is satisfied with the following Equations (1) and (2):

$$\text{volume resistivity} \geq 1.0 \times 10^6 \ \Omega \cdot \text{cm} \quad (1)$$

$$(M_{30}<100°\ \text{C.}>/M_{30}<23°\ \text{C.}>-1)\times 100 \geq -15\% \quad (2)$$

where $M_{30}<23°\ \text{C.}>$ is a tensile stress at elongation of 30% as measured by a tensile test at a room temperature; and $M_{30}<100°\ \text{C.}>$ is a tensile stress at elongation of 30% as measured by a tensile test at 100° C.

(3) The rubber product is obtained by vulcanizing the rubber composition (1) or (2).

According to the present invention, a rubber composition and a rubber product can be obtained, which are sulfur vulcanization system to be easily fabricated and have a reduced change in rigidity at an elevated temperature, a higher volume resistivity and a good workability.

DETAILED DESCRIPTION

Aspects of each element according to the present invention will be now described.

1. EPDM Polymer

EPDM (ethylene-propylene-conjugated diene rubber) polymer is not particularly limited, not preferably includes those having a Mooney viscosity $ML_{1+4}$ (according to JIS K6300-1) of 40 to 200 at 125° C. in that good workability or the like can be ensured. If the value is smaller than 40, kneading or the like is difficult to be performed, whereas if larger than 140, extrusion ability becomes poor. Also, those having an amount of diene of 4 to 10% by mass can preferably obtain a good product. In addition, those having an amount of ethylene of 40 to 70% by mass can preferably obtain a good product.

2. Carbon Black

Carbon black is not particularly limited, but preferably includes those having an iodine absorption amount of 24 to 45 mg/g (according to JIS K6217-2001), indicating a total specific surface area, including micro-pores. If the value is smaller than 24 mg/g, mechanical properties, such as tensile strength become poor, whereas if larger than 45 mg/g, dispersion during kneading is likely to be insufficient.

Also, those having a DBP absorption amount of 100 to 160 cm³/100 g (according to JIS K6217-2001), indicating a structure which is a degree of aggregate development, is preferable in terms of balancing between high reinforcing ability and high electric resistance. There is a tendency that if the value is 100 cm³/100 g, an action of reinforcing a rubber is decreased so that tensile strength is reduced, whereas if larger than 160 cm³/100 g, volume resistivity of the rubber is decreased A formulation ratio of carbon black is not particularly limited, but preferably is 10 to 28% by mass in the total filling amount of rubber composition, more preferably 18 to 26% by mass. There is a tendency that if the ratio is smaller than 10% by mass, the action of reinforcing the rubber is decreased so that tensile strength is reduced, whereas if larger than 26% by mass, volume resistivity of the rubber is decreased.

3. Electrical Insulating Fillers

Electrical insulating fillers can employ, but is not limited to, those generally called as a white filler. The white filler is distinguished and handled according to particle shapes thereof, such as amorphous filler, spindle-shaped filler, plate-shaped filler, needle-shaped filter and the like, and herein will be also distinguished and represented by particle shapes thereof.

3-1. Amorphous or Spindle-shaped Filler

Amorphous filler and spindle-shaped filler exhibit the same action in the present invention and accordingly are handled as one group, and thus either one or a combination of both may be employed.

Amorphous or spindle-shaped filler is not particularly limited, but preferably include those having an average particle diameter of 1 to 10 μm, as measured by micro-track method. If the value is smaller than 1 μm, rigidity at an elevated temperature becomes poor, whereas if larger than 10 μm, mechanical properties, such as tensile strength, become poor.

Also, a specific surface area as measured by BET method is preferably 2.0 to 7.0 m²/g. If the value is smaller than 2.0 m²/g, mechanical properties, such as tensile strength, become poor, whereas if larger than 7.0 m²/g, rigidity at an elevated temperature becomes poor.

Amorphous filler is not particularly limited, but may include, for example, ground calcium carbonate or the like.

Spindle-shaped filler is not particularly limited, but may include, for example, precipitated calcium carbonate or the like.

3-2. Plate-shaped Filler

Plate-shaped filler is not particularly limited, but preferably includes those having an average particle diameter of 0.1 to 5.0 μm, as measured by micro-track method. If the value is smaller than 0.1 μm, dispersion during kneading is likely to be insufficient, whereas if larger than 5.0 μm, mechanical properties, such as tensile strength, become poor. Also, a specific surface area as measured by BET method is preferably 10 to 25 $m^2/g$. If the value is smaller than 10 $m^2/g$, mechanical properties, such as tensile strength, become poor, whereas if larger than 25 $m^2/g$, dispersion during kneading is likely to be insufficient.

Plate-shaped filler is not particularly limited, but may include, for example, powder talc, hard clay, surface-treated clay, calcined clay and the like, and one, two or more selected from such a group may be employed.

3-2. Formulation Ratio

A total formulation ratio of electric insulating fillers is not particularly limited, but preferably is 80 to 150 parts by mass, based on 100 parts by mass of EPDM polymer, more preferably 90 to 142 parts by mass. If the formulation ratio is smaller than 80 parts by mass, electric insulation becomes poor, whereas if larger than 150 parts by mass, dispersion during kneading is likely to be insufficient. A formulation ratio of amorphous or spindle-shaped filler to plate-shaped filler is not particularly limited, but preferably is 95:5 to 10:90, more preferably 91:9 to 11:89. The reason that amorphous or spindle-shaped filler constitutes 10 or more % by mass of the filler is to reduce a change in rigidity at an elevated temperature. As described above, the reason is believed that particle shapes of plate-shaped or needle-shaped filler are changed by following a viscous movement of polymer at an elevated temperature, but particle shapes of amorphous or spindle-shaped filler are kept without following the viscous movement of polymer even at an elevated temperature.

4. Softener

Softener is not particularly limited, but may include, for example, oil, fatty acid and the like. Oil is not particularly limited, but preferably includes those having a kinematic viscosity of 90 to 500 $mm^2/s$ (according to JIS K2283) at 40° C. If the value is smaller than 90 $mm^2/s$, heat resistance is decreased, whereas if lager than 500 $mm^2/s$, handling ability during kneading is decreased.

A formulation ratio of oil is not limited, but preferably is 30 to 75 parts by mass, based on 100 parts by mass of EPDM polymer, more preferably 34 to 73 parts by mass. If the formulation ratio is smaller than 30 parts by mass, viscosity of un-vulcanized rubber material is increased, whereas if larger than 75 parts by mass, strength thereof is decreased.

5. Sulfur-based Vulcanizing Agent

Sulfur-based Vulcanizing Agent is an essential component, but vulcanization accelerator, vulcanization acceleration aid or the like may be additionally contained as optional components.

5-1. Sulfur-based Vulcanizing Agent

Sulfur-based Vulcanizing Agent is not particularly limited, but may include, for example, powdered sulfur, sulfur dichloride, morpholine-disulfide (DTDM), dithiodicaprolactam (DTDC), alkylphenol-disulfide (APDS), polymeric polysulfide or the like, and one, two or more selected from such a group may be employed.

5-2. Vulcanization Accelerator

Vulcanization accelerator is not particularly limited, but may include, for example, TMTD, TETD, DPTT, and TBTD based on thiram; ZnBDC, ZnEDC, ZnMDC, and ZnEPDC based on dithiocarbamate; MBT, MBTS, ZnMBT, CMBT, and MDB based on thiazole; CBS, BBS, and OBS based on sulfonamide, or the like, and one, two or more selected from such a group may be employed.

In following Table 1, chemical structural formula, molecular weight (M. W.), the number of sulfur to be emitted, and active sulfur amount (%) of the above four kinds based on thiram, the above WDB based on thiazole, and Si69 which is a product by Degussa and is a polysulfide type silane coupling agent are shown. Table 1 is quoted from Masakazu Morita. 1997, *Characteristics and recent formulation technology of vulcanizing preparations for diene rubber*, Polymer digest (rubber industry), 49, No. 8, 27. This literature is obtainable from Sanshin Chemical Industry's website.

TABLE 1

| symbol | chemical structural formula | M. W. | number of emitted sulfur | active sulfur amount (%) |
|---|---|---|---|---|
| TT (TMTD) | $(CH_3)_2N-C(=S)-S-S-C(=S)-N(CH_3)_2$ | 240 | 1 | 13.3 |
| TET (TETD) | $(C_2H_5)_2N-C(=S)-S-S-C(=S)-N(C_2H_5)_2$ | 296 | 1 | 10.8 |
| TBT (TBTD) | $(C_4H_9)_2N-C(=S)-S-S-C(=S)-N(C_4H_9)_2$ | 409 | 1 | 7.8 |
| TRA (DPTT) | piperidyl-N-C(=S)-S-S-S-C(=S)-N-piperidyl | 384 | 3 | 25.0 |

TABLE 1-continued

| symbol | chemical structural formula | M. W. | number of emitted sulfur | active sulfur amount (%) |
|---|---|---|---|---|
| MDB | (benzothiazole)–S–S–N(morpholine) | 284 | 1 | 11.3 |
| Si 69 | $(C_2H_5O)_3Si(CH_2)_3$—S—S—S—S—$(CH_2)_3Si(OC_2H_5)_3$ | 550 | (4) | (23.3) |

5-3. Total Sulfur Content

A total sulfur content is the sum of an amount of sulfur contained in the sulfur-based vulcanizing agent, an amount of sulfur emitted from the vulcanization accelerator during the vulcanization, and also if sulfur is contained in other formulation components, an amount of sulfur therein.

A formulation ratio of the total sulfur content is not particularly limited, but preferably is 1.3 to 2.0 parts by mass, based on 100 parts by mass of EPDM polymer, more preferably 1.5 to 1.8 parts by mass. If the formulation ratio is smaller 1.3 parts by mass, reduction rate in rigidity at an elevated temperature is increased, whereas if larger 2.0 parts by mass, thermal aging resistance becomes poor.

A ratio of the total sulfur content to the total filling amount of rubber composition is not particularly limited, but preferably is 0.35 to 0.60% by mass, more preferably 0.40 to 0.55% by mass. By selecting the ratio within such a range, the rubber can be prevented from being excessively hardened and also a reduction rate in rigidity thereof at an elevated temperature of 125° C. can be reduced.

6. Other Formulation Components

The rubber composition may or not contain formulation components other than formulation components as described above. Other formulation components are not particularly limited, but may include, for example, zinc oxide processing aids, anti-aging agents, coloring agents or the like.

7. Parts by Mass of the Entire Rubber Composition (Total Filling Amount)

The total filling amount of rubber composition is not particularly limited, but preferably is 300 to 420 parts by mass. There is a tendency that if the value is smaller than 300 parts by mass, texture on the extrusion surface becomes poor, whereas if larger than 420 parts by mass, tensile strength is decreased.

8. Properties of Vulcanizing Components

The reason that a volume resistivity is set to be $1.0 \times 10^6$ Ω·cm or more as in the above Equation 1 and a change rate in rigidity between a room temperature and 100° C. is set to be −15% or more as in the above Equation 2 is to desirably use the rubber for applications, such as automobile water hoses, which require a higher volume resistivity and a smaller change in physical properties (in particular, rigidity) thereof in high temperature service environments.

EXAMPLES

Samples of rubber compositions according to Examples and Comparative Examples, of which formulations are shown in Table 2, were fabricated.

TABLE 2

| | | Formulations (parts by mass) | | | | | | | | |
|---|---|---|---|---|---|---|---|---|---|---|
| | | | Carbon Black ① | | | Amorphous or Spindle-shaped Filler ② | | Plate-Shaped Filler ③ | | |
| | | EPOM Polymer | SEAST G-FY | SEAST G-50 | Oil Amount | Amorphous Filler Ground Calcium Carbonate | Spindle-shaped Filler Precipitated Calcium Carbonate | Hard Clay | Powder Talc | Surface-treated Clay |
| | No. *: Comparative Examples | EP27 + EP107 | | | | | | | | |
| Difference between Total Filling Amount and Total Sulfur Content | *Comparative Example 1 | 100 | 0 | 69 | 34 | 60 | 0 | 48 | 0 | 0 |
| | *Comparative Example 2 | 100 | 0 | 75 | 46 | 60 | 0 | 60 | 0 | 0 |
| | *Comparative Example 3 | 100 | 0 | 77.5 | 59.5 | 56 | 0 | 83 | 0 | 0 |
| | *Comparative Example 4 | 100 | 0 | 90 | 73 | 56 | 0 | 86 | 0 | 0 |
| | Example 1 | 100 | 0 | 69 | 34 | 60 | 0 | 48 | 0 | 0 |
| | Example 2 | 100 | 0 | 75 | 46 | 60 | 0 | 60 | 0 | 0 |
| | *Comparative Example 5 | 100 | 0 | 77.5 | 59.5 | 56 | 0 | 83 | 0 | 0 |
| | *Comparative Example 6 | 100 | 0 | 90 | 73 | 56 | 0 | 86 | 0 | 0 |
| | Example 3 | 100 | 0 | 69 | 34 | 60 | 0 | 48 | 0 | 0 |
| | Example 4 | 100 | 0 | 75 | 46 | 60 | 0 | 60 | 0 | 0 |
| | Example 5 | 100 | 0 | 77.5 | 59.5 | 56 | 0 | 83 | 0 | 0 |
| | Example 6 | 100 | 0 | 90 | 73 | 56 | 0 | 86 | 0 | 0 |

TABLE 2-continued

| | No. *: Comparative Examples | | | | | | | | |
|---|---|---|---|---|---|---|---|---|---|
| Difference in Types of Fillers | Example 7 | 100 | 0 | 80 | 30 | 120 | 0 | 0 | 0 | 0 |
| | Example 8 | 100 | 0 | 78 | 43 | 90 | 0 | 30 | 0 | 0 |
| | Example 9 | 100 | 0 | 73 | 50 | 30 | 0 | 90 | 0 | 0 |
| | *Comparative Example 7 | 100 | 0 | 70 | 53 | 0 | 0 | 120 | 0 | 0 |
| | Example 10 | 100 | 0 | 75 | 46 | 60 | 0 | 0 | 60 | 0 |
| | Example 11 | 100 | 0 | 75 | 46 | 60 | 0 | 0 | 0 | 60 |
| | Example 12 | 100 | 0 | 75 | 46 | 0 | 60 | 60 | 0 | 0 |
| Difference in Types and Amounts of Carbons | Example 13 | 100 | 44 | 44 | 55 | 10 | 0 | 80 | 0 | 0 |
| | Example 14 | 100 | 44 | 44 | 40 | 95 | 0 | 10 | 0 | 0 |
| | Example 15 | 100 | 90 | 0 | 40 | 95 | 0 | 10 | 0 | 0 |
| | *Comparative Example 8 | 100 | 104 | 50 | 70 | 10 | 0 | 0 | 0 | 0 |

| | | Formulations (parts by mass) | | | |
|---|---|---|---|---|---|
| | | Vulcanizing Agent and Vulcanization Accelerator | | | |
| | No. *: Comparative Examples | Powdered Sulfur | Total Sulfur Content (parts by mass) ④ | Total Filling Amount ⑤ | Ratio of Carbon Black ①/⑤ |
| Difference between Total Filling Amount and Total Sulfur Content | *Comparative Example 1 | 0.7 | 1.25 | 322 | 0.21 |
| | *Comparative Example 2 | 0.7 | 1.25 | 352 | 0.21 |
| | *Comparative Example 3 | 0.7 | 1.25 | 385 | 0.20 |
| | *Comparative Example 4 | 0.7 | 1.25 | 415 | 0.22 |
| | Example 1 | 0.9 | 1.5 | 322 | 0.21 |
| | Example 2 | 0.9 | 1.5 | 352 | 0.21 |
| | *Comparative Example 5 | 0.9 | 1.5 | 385 | 0.20 |
| | *Comparative Example 6 | 0.9 | 1.5 | 415 | 0.22 |
| | Example 3 | 1.12 | 1.75 | 322 | 0.21 |
| | Example 4 | 1.12 | 1.75 | 352 | 0.21 |
| | Example 5 | 1.12 | 1.75 | 385 | 0.20 |
| | Example 6 | 1.12 | 1.75 | 415 | 0.22 |
| Difference in Types of Fillers | Example 7 | 1.12 | 1.75 | 350 | 0.23 |
| | Example 8 | 1.12 | 1.75 | 351 | 0.22 |
| | Example 9 | 1.12 | 1.75 | 351 | 0.21 |
| | *Comparative Example 7 | 1.12 | 1.75 | 351 | 0.20 |
| | Example 10 | 1.12 | 1.75 | 352 | 0.21 |
| | Example 11 | 1.12 | 1.75 | 352 | 0.21 |
| | Example 12 | 1.12 | 1.75 | 352 | 0.21 |
| Difference in Types and Amounts of Carbons | Example 13 | 1.12 | 1.75 | 345 | 0.26 |
| | Example 14 | 1.12 | 1.75 | 345 | 0.26 |
| | Example 15 | 1.12 | 1.75 | 347 | 0.26 |
| | *Comparative Example 8 | 1.12 | 1.75 | 345 | 0.45 |

Here, a blend of product name EP 27 and product name EP107F, produced by JSR Corporation, was used as EPDM polymer. A mass ratio of the blend was EP27/EP107F=70/30. In this EPDM polymer, a Mooney viscosity $ML_{1+4}$ at 125° C. was 75, a content of ethylene was 56.4% by mass, and a content of diene was 4.5% by mass.

As carbon black, the product names SEAST G-FY or SEAST G-SO, produced by TOKAI CARBON CO., LTD., was used. SEAST G-FY had a DBP absorption amount (according to JIS K6217-2001, Method A) of 152 $cm^3$/100 g. SEAST G-SO had a DBP absorption amount (according to JIS K6217-2001, Method A) of 115 $cm^3$/100 g. Ratios of an amount of carbon black (the part number thereof is represented by the circled number 1) to the total filling amount of rubber composition (the part number thereof is represented by the circled number 5) are shown in Table 2.

As oil, a paraffinic oil (produced by JX Nippon Oil & Gas Exploration) was used, which had a kinematic viscosity of 168.7 $mm^2$/s (according to JIS K2283) at 40° C.

As electrical insulating amorphous filler, a ground calcium carbonate (the product name WHITON B, produced by Shiraishi Kogyo Kaisha, Ltd) was used, which had a specific surface area of 3.5 $m^2$/g as measured by BET method.

As electrical insulating spindle-shaped filler, a precipitated calcium carbonate (the product name SILVER B, produced by Shiraishi Kogyo Kaisha, Ltd) was used, which had a specific surface area of 5.5 $m^2$/g as measured by BET method.

As electrical insulating plate-shaped filler, a hard clay (the product name CROWN Clay, produced by Active Minerals, Inc.) having a specific surface area of 20 $m^2$/g as measured by BET method, a powder talc (the product name MISTRON VAPOR, produced by Nihon Mistron Co., Ltd.) having a specific surface area of 16 $m^2$/g as measured by BET method, or a surface-treated clay (the product name BURGESS KE, produced by Burgess Pigment Company) having a specific surface area of 16 $m^2$/g as measured by BET method was used.

The amorphous or spindle-shaped filler is represented by the circled number 2, and the plate-shaped filler is represented by the circled number 3.

As sulfur-based vulcanizing agent, a powdered sulfur (200-mesh sized sulfur powder of the product name GOLDEN FLOWER, produced by Tsurumi Chemical Industry Co., Ltd.) was used.

As vulcanization accelerator, a combination of the product names NOCCELER MDB, NOCCELER TT and NOCCELER TRA, produced by OUCHI SHINKO CHEMICAL INDUSTRIAL CO., LTD., was used.

The part number in the total sulfur content of rubber compositions, which is the sum of an amount of sulfur contained in the sulfur-based vulcanizing agent and an amount of sulfur contained in the vulcanization accelerator is represented by the circled number 4.

Meanwhile, ZnO of 5 parts by mass, stearic acid of 1 part by mass, and processing aid of 3 parts by mass as other formulation components were added to every Examples and Comparative Examples.

Rubber composition samples according to the above Examples and Comparative Examples was fabricated by uniformly kneading raw materials, which each is weighed at formulation ratios in Table 2, using a 1.3 L intermix and an 8 inch roll, and then vulcanizing under a condition of a temperature of 160° C. and a time period of 15 minutes.

With respect to rubber composition samples of Examples and Comparative Examples fabricated as described above, the following measurements and observations are performed.

(1) Mooney viscosity test: Mooney viscosity tests were performed using a L-shaped rotor at a test temperature of 100° C. according to JIS K6300-1, in which samples are preheated during 1 minute and the rotor is rotated during 4 minutes, thereby measuring Mooney viscosities $ML_{1+4}$. The values represent workability.

(2) Volume resistivity: hardness tests were performed using a type A durometer at a test temperature of a room temperature according to JIS K6253, thereby measuring harnesses.

(3) Hardness test: hardness tests were performed using a type A durometer at a test temperature of a room temperature according to JIS K6253, thereby measuring harnesses.

(4) Tensile test: tensile tests were performed at a room temperature according to JIS K6251, thereby measuring tensile strengths TB, elongations at fracture EP, and tensile stresses $M_{30}$ (modulus) at elongation of 30%. In addition, tensile tests wear also performed at 100° C., thereby measuring tensile stresses $M_{30}$ at elongation of 30%.

(5) Observations of extrusion surface textures: samples were extruded by a small-scale extruder and the extrusion surface textures thereof were visually observed.

The results of the measurements and observations as described above are shown in Table 3. In addition, values (%) of $(M_{30}<100°\text{C.}>/M_{30}<23°\text{C.}>-1)\times 100$, representing change rates in rigidity between the room temperature and 100° C., are shown in Table 3.

TABLE 3

| | | Physical Properties | | | | | | | | |
|---|---|---|---|---|---|---|---|---|---|---|
| | | Workability | Electric Resistance | Physical Properties at 23° C. | | | Physical Property at 100° C. | Reduction Rate in Rigidity | Workability |
| | No.*: Comparative Examples | Mooney Viscosity $ML_{1+4}$, 100° C. | Volume Resistivity (Ω·cm) | Hardness | Tensile Strength TB (MPa) | Elongation at Fracture EB (%) | Tensile Stress $M_{30}$ (MPa) | Tensile Stress $M_{30}$ (MPa) | ($M_{30}$ 100° C./ $M_{30}$ 23° C. − 1) × 100 (%) | Extrusion Surface Texture |
| Difference between Total Filling Amount and Total Sulfur Content | *Comparative Example 1 | 92 | 3.42E+06 | 75 | 11.9 | 480 | 1.715 | 1.452 | −15.3 | o |
| | *Comparative Example 2 | 85 | 2.84.E+06 | 75 | 11.2 | 490 | 1.627 | 1.338 | −17.8 | o |
| | *Comparative Example 3 | 77 | 1.09E+07 | 75 | 10.1 | 520 | 1.540 | 1.207 | −21.8 | o |
| | *Comparative Example 4 | 72 | 1.20E+05 | 75 | 9.5 | 580 | 1.463 | 1.132 | −22.6 | o |
| | Example 1 | 91 | 3.42E+06 | 76 | 11.9 | 450 | 1.778 | 1.553 | −12.7 | o |
| | Example 2 | 86 | 6.81.E+06 | 76 | 11.2 | 460 | 1.690 | 1.449 | −14.3 | o |
| | *Comparative Example 5 | 76 | 9.80E+06 | 76 | 10.1 | 490 | 1.603 | 1.318 | −17.8 | o |
| | *Comparative Example 6 | 71 | 1.50E+06 | 76 | 9.8 | 500 | 1.525 | 1.242 | −18.6 | o |
| | Example 3 | 80 | 4.42E+06 | 77 | 11.9 | 410 | 1.841 | 1.663 | −9.7 | o |
| | Example 4 | 83 | 3.22E+06 | 77 | 11.2 | 430 | 1.753 | 1.559 | −11.1 | o |
| | Example 5 | 75 | 8.90E+06 | 77 | 1.1 | 450 | 1.666 | 1.428 | −14.3 | o |
| | Example 6 | 70 | 2.30E+06 | 77 | 9.6 | 460 | 1.589 | 1.353 | −14.8 | o |
| Difference in Types of Fillers | Example 7 | 76 | 1.31E+06 | 77 | 10.5 | 370 | 1.650 | 1.580 | −4.2 | x |
| | Example 8 | 76 | 3.85E+06 | 77 | 10.7 | 400 | 1.710 | 1.670 | −8.2 | o |
| | Example 9 | 80 | 5.42E+06 | 77 | 11.4 | 450 | 1.810 | 1.550 | −14.4 | o |
| | *Comparative Example 7 | 83 | 7.53E+06 | 77 | 11.6 | 470 | 1.650 | 1.540 | −16.8 | o |
| | Example 10 | 76 | 3.36E+06 | 77 | 11.0 | 410 | 1.720 | 1.540 | −10.5 | o |
| | Example 11 | 74 | 4.52E+06 | 77 | 11.6 | 450 | 1.740 | 1.570 | −9.8 | o |
| | Example 12 | 77 | 3.54E+06 | 77 | 11.3 | 440 | 1.760 | 1.559 | −11.4 | o |
| Difference in Types and Amounts of Carbons | Example 13 | 74 | 1.28E+06 | 78 | 12.0 | 380 | 1.850 | 1.650 | −10.8 | o |
| | Example 14 | 77 | 1.75E+06 | 78 | 11.6 | 340 | 1.760 | 1.640 | −6.8 | o |
| | Example 15 | 73 | 3.35E+06 | 77 | 10.9 | 320 | 1.810 | 1.760 | −2.8 | o |
| | *Comparative Example 8 | 104 | 2.75E+05 | 80 | 14.5 | 190 | 2.240 | 2.240 | −6.8 | o |

Figure 1:
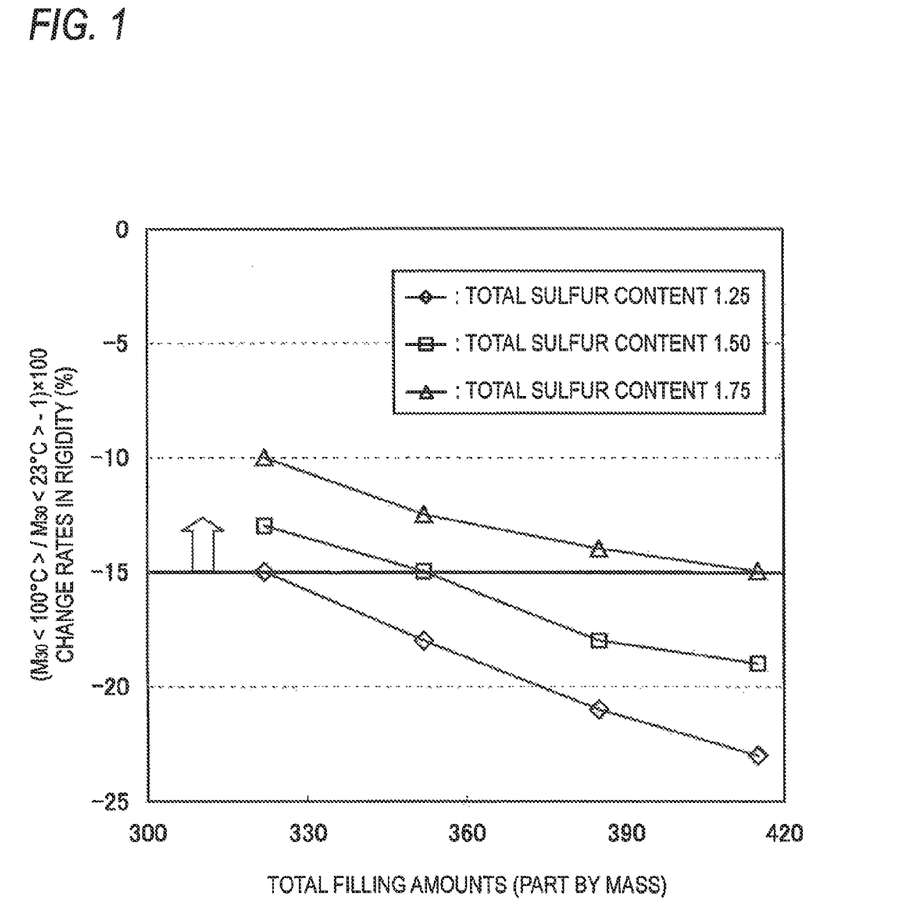
FIG. 1 is a graph showing an influence of a total filling amount of rubber compositions and a total sulfur content on a change rate in rigidity between a room temperature and 100° C. in Examples and Comparative Examples.

Rubber composition samples according to Examples 1 to 6 and Comparative Examples 1 to 6 are investigated with respect to influences of differences in total filling amount of rubber compositions and differences in total sulfur content thereof. For these samples, graphs representing according to each total sulfur content a relationship between the change rate in rigidity and the total filling amount of rubber compositions as described above are shown in FIG. 1. There was a tendency that the more the total sulfur content and also the less the total filling amount of rubber composition, the smaller the change rates (absolute value) in rigidity were. Also, all samples had high volume resistivities. Samples which had a change rate in rigidity of ≥−15% and also a volume resistivity of ≥1.0×10$^6$ Ω·cm were evaluated as Examples, and the other samples were considered as Comparative Examples.

Also, Examples 7 to 12 and Comparative Example 7 are investigated with respect to influences of properties according to types of fillers. When a ratio of amorphous fillers to plate-shaped filler was changed from 120:0 to 90:30, 30:90 and 120:0 as in Examples 7 to 9 and Comparative Example 7, there was a tendency that the more the amorphous fillers and also the less the plate-shaped fillers, the smaller the change rates (absolute value) in rigidity were. Also, when amorphous or spindle-shaped filler and plate-shaped filler were combined at a ratio of 60:60 as in Examples 10 to 12, the change rates (absolute value) in rigidity were smaller, regardless of whether amorphous filler or spindle-shaped filler and also regardless of types of plate-shaped filler.

In addition, Examples 13 to 15 and Comparative Example 8 are investigated with respect to influences of properties according to types of carbon blacks. When a ratio of SEAST G-FY (a DBP absorption amount of 152 cm$^3$/100 g) and SEAST G-SO (a DBP absorption amount of 115 cm$^3$/100 g) was changed from 44:44 to 90:0, there was a tendency that, although the change rates (absolute values) in rigidity were smaller for all cases, the volume resistivities thereof became lower. In addition, when the ratio was changed to 104:50 and the total amount thereof was increased, the volume resistivity was reduced by one order of magnitude.

Meanwhile, Example 7 had a slightly rough extrusion surface texture, but the other Examples and Comparative Examples had good extrusion surface textures.

Next, as shown in Table 3, regression coefficients a1, a2, a3 and a4 were obtained from the above measurement results of all Examples and all Comparative Examples by performing multiple regression analyses by a least square method, using as individual independent variables S, Wc·D, Wha/Ha and Whb/Hb in the following Equation 3x.

$$Z = a1S + a2Wc·D + a3Wha/Ha + a4Whb/Hb \qquad \text{Equation 3x}$$

where

Z: a value of the regression equation
S: a total sulfur content/a total filling amount of rubber composition
Wc: a formulation ratio of carbon black (part by mass based on 100 parts by mass of EPDM polymer)
D: a DBP absorption amount of carbon black (Method A, cm$^3$/100 g)
Wha: a formulation ratio of amorphous or spindle-shaped filler (part by mass based on 100 parts by mass of EPDM polymer)
Ha: a specific surface area of amorphous or spindle-shaped filler (m$^2$/g)
Whb: a formulation ratio of plate-shaped filler (part by mass based on 100 parts by mass of EPDM polymer)
Hb: a specific surface area of plate-shaped filler (m$^2$/g)
a1, a2, a3 and a4: regression coefficients
a1 = 5.5×10$^{-3}$
a2 = 0.45×10$^3$
a3 = 0.21
a4 = −0.65

TABLE 4

| | No. *: Comparative Examples | S · 1000 ④/⑤ × 1000 | Wc · D/1000 ① × DBP ÷ 1000 | Wha/Ha ② ÷ Specific Surface Area | Whb/Hb ③ ÷ Specific Surface Area | Regression Equation Values |
|---|---|---|---|---|---|---|
| Difference between Total Filling Amount and Total Sulfur Content | *Comparative Example 1 | 3.88 | 7.94 | 17.14 | 2.40 | 26.9 |
| | *Comparative Example 2 | 3.55 | 8.63 | 17.14 | 3.00 | 25.0 |
| | *Comparative Example 3 | 3.25 | 8.91 | 16.00 | 4.15 | 22.5 |
| | *Comparative Example 4 | 3.01 | 10.35 | 16.00 | 4.30 | 21.7 |
| | Example 1 | 4.66 | 7.94 | 17.14 | 2.40 | 31.2 |
| | Example 2 | 4.26 | 8.63 | 17.14 | 3.00 | 28.9 |
| | *Comparative Example 5 | 3.90 | 8.91 | 16.00 | 4.15 | 26.0 |
| | *Comparative Example 6 | 3.61 | 10.35 | 16.00 | 4.30 | 25.0 |
| | Example 3 | 5.43 | 7.94 | 17.14 | 2.40 | 35.4 |
| | Example 4 | 4.97 | 8.63 | 17.14 | 3.00 | 32.8 |
| | Example 5 | 4.55 | 8.91 | 16.00 | 4.15 | 29.6 |
| | Example 6 | 4.22 | 10.35 | 16.00 | 4.30 | 28.3 |
| Difference in Types of Fillers | Example 7 | 5.00 | 9.20 | 34.29 | 0.00 | 38.7 |
| | Example 8 | 4.99 | 8.97 | 25.71 | 1.50 | 35.8 |
| | Example 9 | 4.99 | 8.470 | 8.57 | 4.50 | 30.0 |
| | *Comparative Example 7 | 4.99 | 8.05 | 0.00 | 6.00 | 27.1 |
| | Example 10 | 4.97 | 8.63 | 17.14 | 3.75 | 32.3 |
| | Example 11 | 4.97 | 8.63 | 17.14 | 3.75 | 32.3 |
| | Example 12 | 4.97 | 8.63 | 10.91 | 3.00 | 31.5 |
| Difference in Types and Amounts of | Example 13 | 5.07 | 11.75 | 2.86 | 4.00 | 31.1 |
| | Example 14 | 5.07 | 11.75 | 27.14 | 0.50 | 38.5 |
| | Example 15 | 5.04 | 13.68 | 27.14 | 0.50 | 39.2 |
| | *Comparative | 5.07 | 21.56 | 2.86 | 0.00 | 38.2 |

TABLE 4-continued

| No.<br>*: Comparative<br>Examples | | S · 1000<br>④/⑤ ×<br>1000 | Wc · D/1000<br>① × DBP ÷<br>1000 | Wha/Ha<br>② ÷ Specific<br>Surface Area | Whb/Hb<br>③ ÷ Specific<br>Surface Area | Regression<br>Equation<br>Values |
|---|---|---|---|---|---|---|
| Carbons | Example 8 | | | | | |
| | | ↑ | ↑ | ↑ | ↑ | Intercept |
| | Regression<br>Coefficient | 5.5 | 0.45 | 0.21 | −0.65 | −43.5 |
| | Standard<br>Deviation | 0.39 | 0.13 | 0.005 | 0.30 | |
| | Standard<br>Deviation for<br>Coefficient of<br>Determination | N/A | N/A | 1.02 | 0.97 | |
| | Residual<br>Degrees of<br>Freedom of<br>Variance Ratio | N/A | N/A | 18.00 | 138.10 | |
| | Residual Sum<br>of Squares for<br>Regression Sum<br>of Squares | N/A | N/A | 19.02 | 583.90 | |

Figure 2:
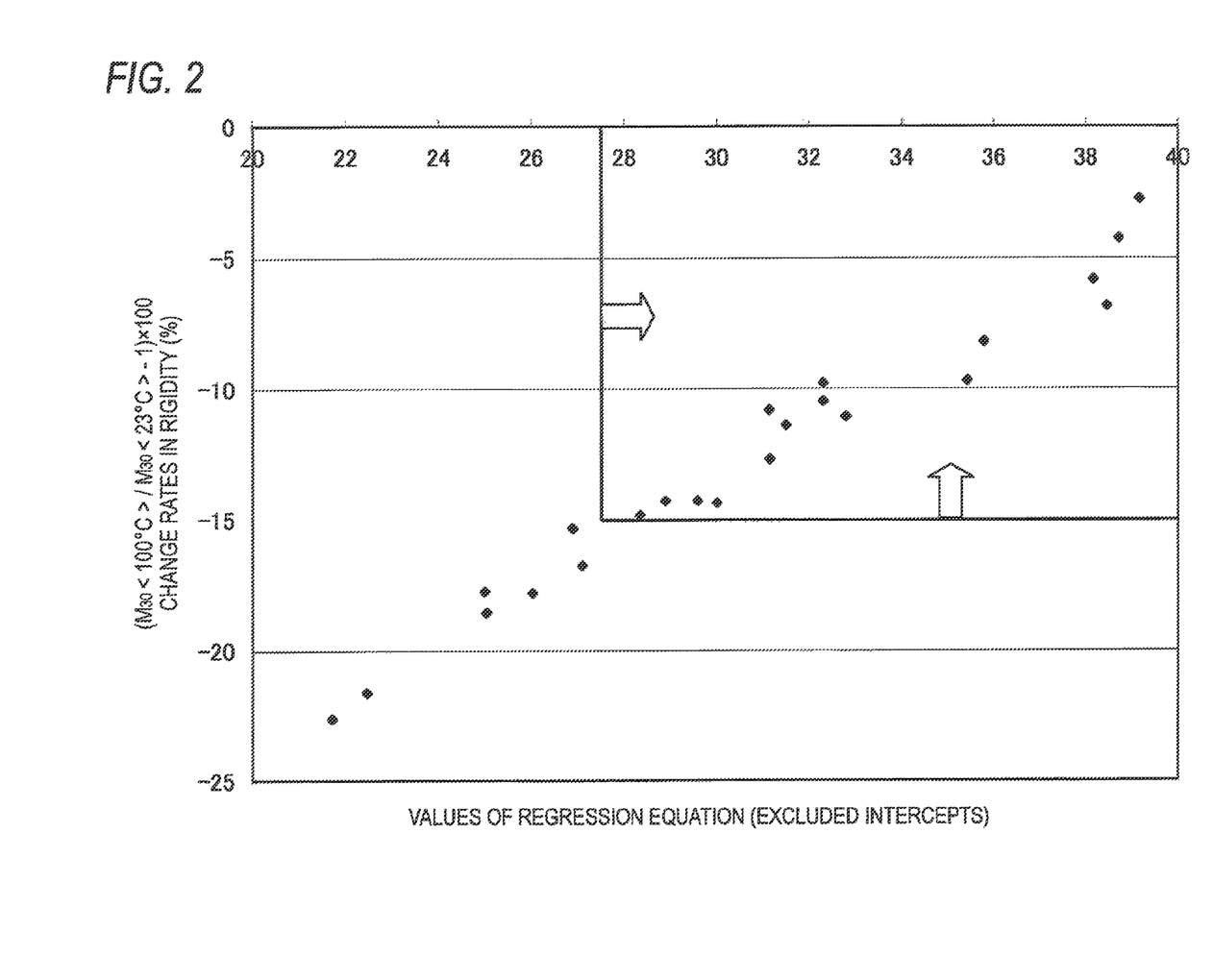
FIG. 2 is a graph showing a relationship of change rates in rigidity and values Z of regression equation.

In FIG. 2, a graph representing a relationship of the change rates in rigidity and the values Z (excluded intercepts) of regression equation as described above is shown. It will be found that the change rate in rigidity is ≥−15% when the values Z of regression equation is 27.5 or larger.

Meanwhile, the present invention is not limited to the foregoing embodiments, and accordingly, can be appropriately modified and embodied without departing from the sprite and scope of the invention.

What is claimed is:

1. A rubber composition comprising:
an EPDM polymer in an amount of 100 parts by mass;
a carbon black;
electrical insulating fillers in an amount of 87 to 145 parts by mass based on the 100 parts by mass of the EPDM polymer, the electrical insulating filters including a plate-shaped electrical insulating filler and at least one of an amorphous and a spindle-shaped electrical insulating filler, and 10 or more % by mass of the electrical insulating fillers is constituted as the amorphous or spindle-shaped filler;
a softener; and
a sulfur-based vulcanizing agent, wherein
an obtained vulcanized product is satisfied with the following Equations (1) and (2):

$$\text{volume resistivity} \geq 1.0 \times 10^6 \, \Omega \cdot \text{cm} \quad (1)$$

$$(M_{30}{<}100^\circ\text{C.}{>}/M_{30}{<}23^\circ\text{C.}{>}-1) \times 100 \geq -15\% \quad (2)$$

where $M_{30}{<}23^\circ\text{C.}{>}$ is a tensile stress at elongation of 30% as measured by a tensile test at 23° C., and
$M_{30}{<}100^\circ\text{C.}{>}$ is a tensile stress at elongation of 30% as measured by a tensile test at 100° C.

2. The rubber composition according to claim 1, wherein the rubber composition is satisfied with the following regression Equation (3):

$$Z = a1S + a2Wc \cdot D + a3Wha/Ha + a4Whb/Hb \geq 27.5 \quad (3)$$

where Z is a value of the regression equation,
S is a total sulfur content/a total filling amount of rubber composition, in which the total sulfur content is a sum of:
sulfur in sulfur based vulcanizing agent;
sulfur emitted from the vulcanization accelerator during vulcanization; and
sulfur in other agent in the rubber composition in a case where the rubber composition includes other agent,
Wc is a formulation ratio of carbon black (part by mass based on 100 parts by mass of EPDM polymer),
D is a DBP absorption amount of carbon black (Method A, cm³/100 g),
Wha is a formulation ratio of amorphous or spindle-shaped filler (part by mass based on 100 parts by mass of EPDM polymer),
Ha is a specific surface area of amorphous or spindle-shaped filler (m²/g),
Whb is a formulation ratio of plate-shaped filler (part by mass based on 100 parts by mass of EPDM polymer),
Hb is a specific surface area of plate-shaped filler (m²/g),
a1, a2, a3 and a4 are regression coefficients,
$a1 = 5.5 \times 10^{-3}$,
$a2 = 0.45 \times 10^3$,
$a3 = 0.21$, and
$a4 = -0.65$.

3. The rubber composition according to claim 2, wherein a formulation ratio of the carbon black in the total filling amount of the rubber composition is 10 to 28% by mass.

4. The rubber composition according to claim 2, wherein a formulation ratio of the total sulfur content in the total filling amount of the rubber composition is 0.35 to 0.60% by mass.

5. The rubber composition according to claim 2, wherein a formulation ratio of the amorphous or spindle-shaped filler to the plate-shaped filler is 95:5 to 10:90.

6. The rubber composition according to claim 5, wherein the amorphous or spindle-shaped filler is one or two selected from the group consisting of ground calcium carbonate and precipitated calcium carbonate.

7. The rubber composition according to claim 5, wherein the plate-shaped filler is one, two, or more selected from the group consisting of powder talc, hard clay, surface-treated clay, and calcined clay.

8. The rubber composition according to claim 2, wherein a DBP absorption amount of the carbon black is 100 to 160 cm³/100 g.

9. The rubber composition according to claim 2, wherein a Mooney viscosity $ML_{1+4}$ of the EPDM polymer at 125° C. is 40 to 200.

10. A rubber composition comprising:
an EPDM polymer of 100 parts by mass;
a carbon black of 66 to 93 parts by mass;
an electrical insulating filler of 87 to 145 parts by mass;
a softener of 31 to 76 parts by mass; and
a sulfur-based vulcanizing agent and vulcanization accelerator so that a total sulfur content thereof is 1.2 to 1.8 parts by mass,
wherein 10 or more % by mass of the electrical insulating filler is constituted as amorphous or spindle-shaped filler, and
wherein an obtained vulcanized product is satisfied with the following Equations (1) and (2):

$$\text{volume resistivity} \geq 1.0 \times 10^6 \, \Omega\cdot\text{cm} \quad (1)$$

$$(M_{30}{<}100°\text{C.}{>}/M_{30}{<}23°\text{C.}{>}-1) \times 100 \geq -15\% \quad (2)$$

where $M_{30}{<}23°{>}$ is a tensile stress at elongation of 30% as measured by a tensile test at a room temperature; and $M_{30}{<}100°\text{C.}{>}$ is a tensile stress at elongation of 30% as measured by a tensile test at 100° C.

11. A rubber product obtained by vulcanizing the rubber composition according to claim 1.

12. A rubber product obtained by vulcanizing the rubber composition according to claim 10.

* * * * *